(No Model.)
H. C. ARMSTRONG.
LIQUID MEASURE.
No. 269,909. Patented Jan. 2, 1883.
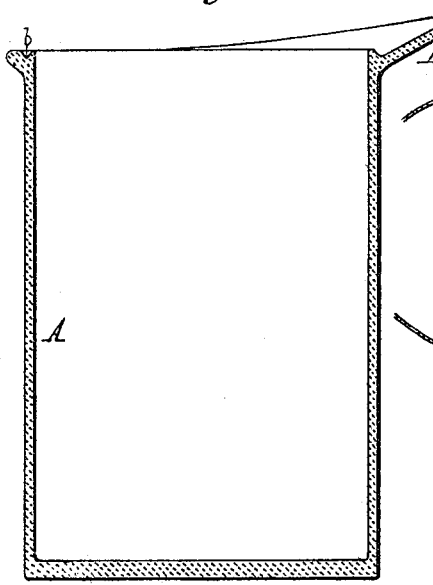
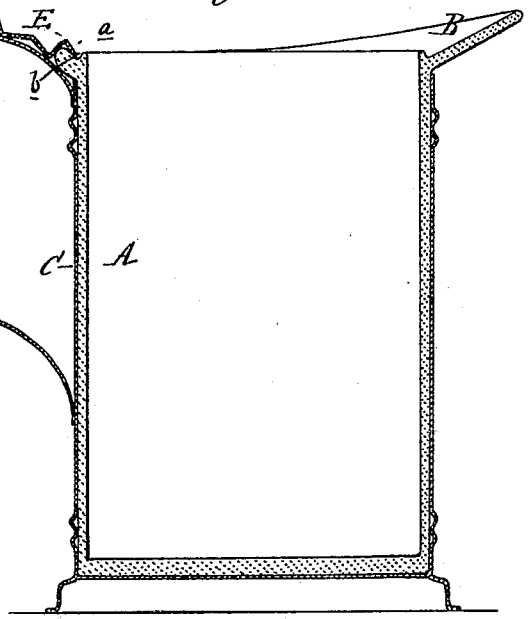
Attest:
A. Barther
Inventor:
Harry C. Armstrong
by his Att'y

United States Patent Office.

HARRY C. ARMSTRONG, OF DETROIT, MICHIGAN.

LIQUID-MEASURE.

SPECIFICATION forming part of Letters Patent No. 269,909, dated January 2, 1883.

Application filed October 4, 1882. (No model.)

*To all whom it may concern:*

Be it known that I, HARRY C. ARMSTRONG, of Detroit, in the county of Wayne and State of Michigan, have invented new and useful Improvements in Liquid-Measures; and I hereby declare that the following is a full, clear, and exact description thereof, reference being had to the accompanying drawings, which form a part of this specification.
The nature of this invention relates to certain new and useful improvements in the manufacture of that class of measuring-vessels which are made of glass and are provided with a metallic casing; and the invention is especially designed to be used in the measurement of acids or other liquids which attack metallic measures, while the construction will be found applicable to measures for all liquid purposes.
The invention consists in the peculiar construction and arrangement of parts, as hereinafter more fully described and claimed.

Figure 1 is a sectional view of the glass measure detached from the case, showing particularly the peculiar shape of the top, which is provided with the pouring-flange, such as is usually found in liquid-measures. Fig. 2 is a vertical section of the complete measure.

In the accompanying drawings, which form a part of this specification, A represents a glass measure, being a straight cylinder with a tight bottom and the flaring pouring-flanged top B.

C represents a sheet-metal case, provided with a handle, D, adapted to receive the glass measure, which is accurately fitted therein. This metallic case is sufficiently deep to receive the entire measure, the top of the case affording a support all around upon which the pour-
ing-flange of the glass measure rests, and the casing entirely incloses the body of the measure, protecting it on all sides. After the glass measure has been inserted in the case the thumb stop E, provided with an overhanging catch a, is soldered to the top of the handle in the usual way, with the overhanging flange engaging with the coincident portion of the flanged top of the measure.

By a construction of a measure in this way one is produced adapted for all liquid measurements, that can be easily cleaned, and is just as convenient for use as the ordinary tin measures employed.

It will be observed that the glass portion is provided with a projecting flange at the rear, leaving a recess, b, to receive the catch a, whereby the latter is kept from contact with acids, &c., which would be very apt to destroy the catch if it projected over the edge, where it would be liable to be splashed by the acid in the measure.

I am aware of the Patent No. 157,222, and make no claim to anything shown therein.

I am also aware of Patent No. 126,750, and make no claim to the construction shown therein.

What I claim as my invention is—

The combination of a glass measure, A, provided with the pouring-flange B and recessed projection b, incased within a metallic case, C, with the thumb-stop E, provided with an overhanging catch, a, adapted to fit the recess b, substantially as and for the purposes described.

HARRY C. ARMSTRONG.

Witnesses:
 H. S. SPRAGUE,
 CHARLES J. HUNT.